United States Patent [19]

Bullick

[11] Patent Number: 4,737,092
[45] Date of Patent: Apr. 12, 1988

[54] AUTOMATIC DOUGH CUTTER

[75] Inventor: Nick A. Bullick, Salt Lake City, Utah

[73] Assignee: Dale W. Turman, Salt Lake City, Utah ; a part interest

[21] Appl. No.: 42,988

[22] Filed: Apr. 27, 1987

[51] Int. Cl.$^4$ ............................................. B28B 13/00
[52] U.S. Cl. ...................................... 425/142; 83/365; 83/370; 425/146; 425/310; 425/311; 425/376 R; 426/518
[58] Field of Search ................. 83/365, 370, 597, 605, 83/639; 425/142, 146, 308, 310, 311, 376 R; 426/518

[56] References Cited

U.S. PATENT DOCUMENTS

| | | | |
|---|---|---|---|
| 3,161,157 | 12/1964 | Fries | 425/311 X |
| 3,969,054 | 7/1976 | Roane | 83/365 X |
| 4,332,538 | 6/1982 | Campbell | 425/142 X |
| 4,442,131 | 4/1984 | Nagy et al. | 426/518 |

Primary Examiner—Charles Hart
Attorney, Agent, or Firm—M. Reid Russell

[57] ABSTRACT

An automatic dough cutter that is preferably for use in a mall type cookie store and includes pneumatically operated moving parts. The dough cutter is contained within a single housing that includes a vessel wherein the dough is deposited and is acted upon by a piston traveling therein to extrude that dough through a nozzle, the invention including an oscillating knife that is operated to swing a blade at set intervals through that extruded dough column cutting end sections therefrom. All of which components including covers, a chute, the knife blade, piston, vessel, dough conveying pipe and nozzle that contact the dough are removable for cleaning so as to limit a possibility of bacteria growth and contamination.

26 Claims, 6 Drawing Sheets

AUTOMATIC DOUGH CUTTER

BACKGROUND OF THE INVENTION

1. Field of the Invention

This invention relates to dough forming machines and particularly to an apparatus for extruding a column of dough and cutting an end segment from that column, the cut dough segment falling into a catchment vessel.

2. Prior Art

An apparatus that includes a hopper structure wherefrom a dough is passed or extruded and that dough formed into shapes or segments is not new. For example, a device for extruding dough and cutting across that dough extrusion so as to form dough segments that are then deposited onto a sheet is shown in a patent by Rhodes, U.S. Pat. No. 4,190,410. Similar to the structure of the Rhodes patent, other devices have employed a hopper structure with an arrangement for capturing and columnizing dough to pass it through a nozzle and each includes an arrangement for sectioning, at intervals, that extruded dough. For example, a patent by Elliott, U.S. Pat. No. 2,383,536, shows such an extruding arrangement with a guillotine type cutter. Also, arrangements of a hopper with extruding nozzle and an arrangement for cutting across the extruded dough are also shown in patents by Kremmling, U.S. Pat. No. 1,932,345, and Weidenmiller, et al., U.S. Pat. No. 2,838,012. None of these devices, however, involves a pneumatic feed, oscillating blade cutter or the particular structural elements of the automatic dough cutter of the present invention.

The oscillating blade dough cutter of the present invention includes a blade with cutting edges formed along opposite blade edges to cut through a column of dough in either direction of swing. Functionally similar to the present invention, a guillotine type of cutter is shown in a patent by Nagy, et al., U.S. Pat. No. 4,442,131, and a wiper or oscillating knife cutter is shown in a patent by Neel, U.S. Pat. No. 4,025,260. Neither of these patents, however, show the particular blade structure of the present invention, in that neither involves a blade arrangement that can be easily dismounted for cleaning. Nor are the Nagy, et al. or Neel devices operated pneumatically and in conjunction with and under the control of an optical sensor as is the present invention.

Further unlike the present invention, none of the art cited above are part of a system of components, covers and a chute that are easily dismounted for cleaning, such that, in operation, the extruding dough will not come in contact with a surface of the assembly that is not a flat surface that is easily cleaned or cannot be removed for cleaning as in a conventional dishwashing machine.

SUMMARY OF THE INVENTION

It is a principal object of the present invention to provide a pneumatically operated automatic dough cutter that will extrude a column of dough under pressure through a nozzle, and will cut that column into segments at set intervals by operation of an oscillating blade.

Another object of the present invention is to provide an automatic dough cutter that includes an arrangement of easily removable components to include, the dough extruding components, covers and a chute that, except for flat easily cleanable panel surfaces, constitute all the device elements and surfaces that come in contact with dough as it is extruded and cut, thereby facilitating the cleaning of all the bacteria collecting surfaces as in a conventional dishwashing machine or the like.

Another object of the present invention is to provide an automatic dough cutter that includes a dough reservoir with movable piston, which piston is pneumatically operated to urge the dough through a donut shaped nozzle whereat the dough is cut by operation of the oscillating blade, the dough reservoir including, in addition to pressure relief openings, a reservoir cover and a locking mechanism, a sensor associated therewith that on contact cuts off piston pressurization.

Another object of the present invention is to provide as an oscillating knife arrangement a blade and clamp type mount whereby the blade can easily be dismounted for cleaning.

Another object of the present invention is to provide an optical sensor arrangement that senses the end of a column of dough extruded from the nozzle and commands blade movement so as to cut through that extruded dough.

Still another object of the present invention is to provide, with removable covers of the automatic dough cutter, sensors and associated circuitry for sensing when a cover is not locked in place and "locking out" the assembly until such unlocked condition is corrected.

Still another object of the present invention is to provide an automatic dough cutter that can be safely maintained by a minimally trained individual such as an employee of a shopping mall type cookie store, or the like.

Still another object of the present invention is to provide an automatic dough cutter that can be easily disassembled to facilitate removal of all component assemblies, covers, and a chute as come in contact with dough for cleaning, to minimize a potential for bacteria growth.

In accordance with the above objects, the present invention in an automatic dough cutter includes a frame with panels secured thereto in covering arrangement forming a housing. The housing contains a vessel for receiving dough deposited therein that is preferably cylindrical, includes a piston arranged to travel longitudinally therein and has a removable top. A pneumatic source is provided to move the piston to force dough therefrom, which dough travels through a tube fitted through the removable top and is extruded from a nozzle located in an extrusion panel. The extrusion panel is secured to the housing to extend at a right angle from a housing top. The nozzle has an opening that is suitable for the particular type of dough being extruded.

Adjacent to that nozzle, mounted to the extrusion panel, is a knife that includes a dough edged blade that is operated pneumatically to swing back and forth across the nozzle opening. Blade oscillation is controlled by optical sensors. The optical sensors are aligned to project a light beam from one sensor to be received and sensed by the other, or are in a side by side sealed housing operating as a reflected (proximity) sensing device, the sensors aligned to form a plane that breaks the longitudinal axis of the nozzle opening or, with proximity unit, will read the leading edge of extruding dough. The spacing of the optical sensors from that nozzle end is adjustable for programming a thickness of dough segment to be cut. So arranged, the end of the extruded dough will interface with the light beam passing a pulse to a controller that commands blade movement to cut through the dough, forming a desired thickness of dough section. The cut section of dough falls from the nozzle and passes through an open end of a chute that is hinged to the extrusion panel.

The chute has an arcuate lateral slot formed in a top end to accommodate the oscillating blade, and the opposite chute end is open wherethrough the dough segments fall. The chute has aligned holes formed in the opposite sides or in the top end to accommodate the optical sensor ends and includes a latch for locking it to the extrusion panel. In combination therewith, a latch is provided for both securing the extrusion panel to the vessel and for positively locking the vessel cover over the vessel open end.

Electrically operated position sensors are arranged with the extrusion panel that are operated upon their sensing proper panel and chute positioning and vessel cover locking, which sensors are each preferably a micro-switch or like sensing device that, when closed, enables operation of the various valve solenoids and switches of the automatic dough cutter. Unless proper locking is sensed by the micro-switches the pneumatic components are "locked-out" and will not function.

The combination of the above described covers, vessel cover, chute, and nozzle, along with the detachable cutting blade of the knife, are essentially all machine components that come in contact with dough and so would be susceptible to bacteria contamination. Arranging these components so as to be easily removable allows for their being washable in a conventional dishwashing machine, or the like. These components along with the flat, smooth, easily cleaned extrusion panel surfaces whereto the cover and chute are attached are all the surfaces of the device that actually come in contact with dough.

DETAILED DESCRIPTION

Figure 1:
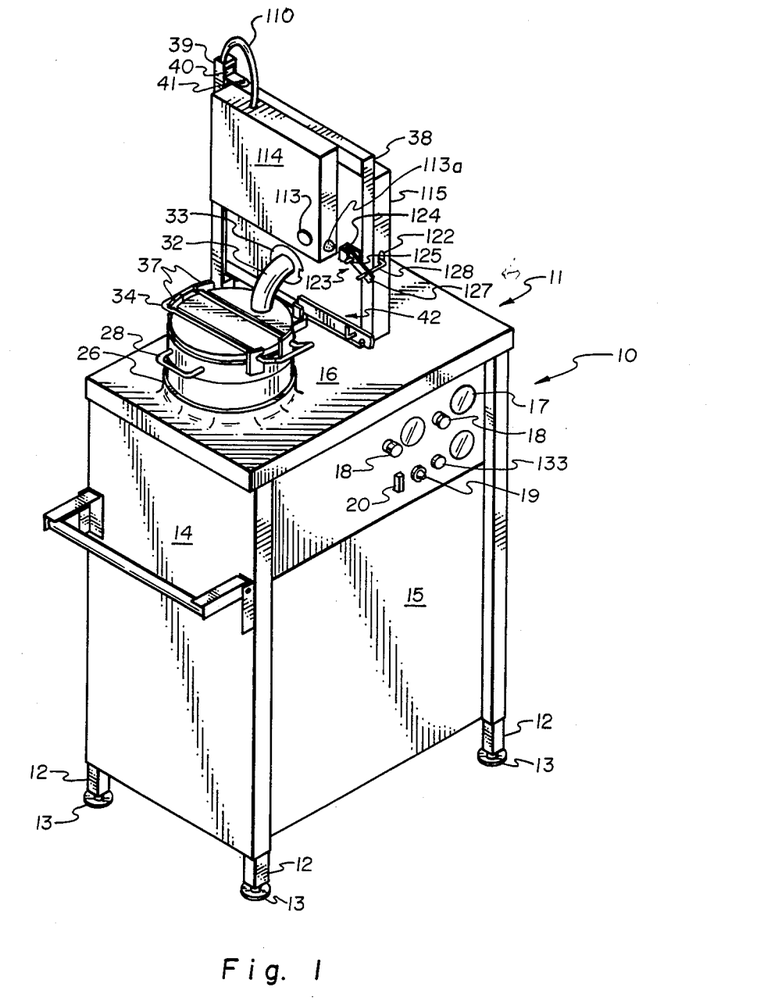
FIG. 1 is a profile prospective view taken from the right side of a preferred embodiment of an automatic dough cutter of the present invention.

FIG. 1 shows in profile perspective view of a preferred embodiment of the automatic dough cutter of the present invention, hereinafter referred to as dough cutter 10. Elements or assemblies of the dough cutter 10, as set out in detail hereinbelow, are contained within a housing 11. The housing 11 is made up of vertical frame members 12 and horizontal frame members, not shown, that are mounted therebetween, spacing apart the vertical frame members to form, effectively, an upright rectangular shape. Each vertical frame member terminates in a foot 13, that are shown to be slides, but should be understood could be wheels, casters, rollers, or the like, within the scope of this disclosure.

Lateral frame members are secured between the vertical frame members 12, supporting the dough cutter components and, along with the vertical frame member, receive cover panels attached thereto. Such cover panel includes side panels 14 and a front panel 15, with a flat top 16 mounted thereon. The front and side panels, 15 and 14, respectively, are secured to the respective frame members by fasteners, not shown, forming the enclosed housing 11.

Figure 7:
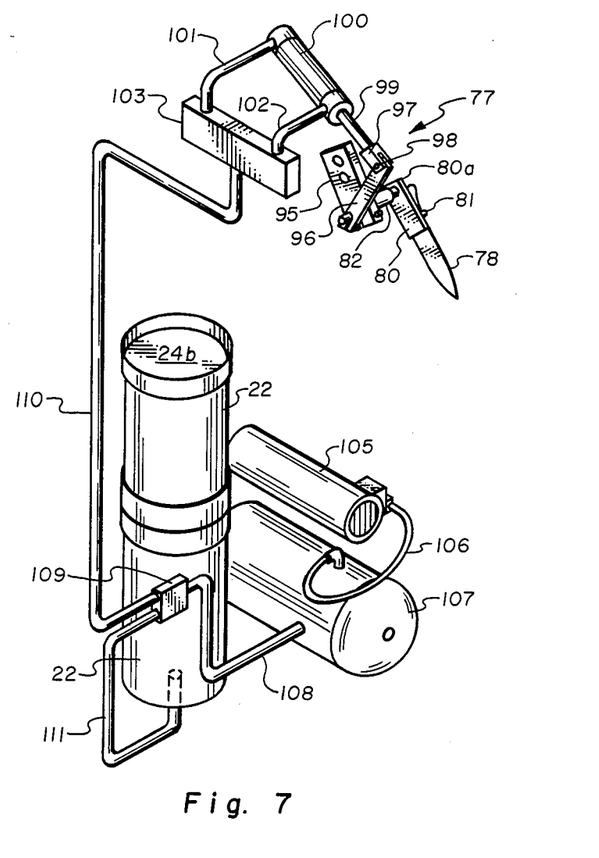
FIG. 7 is a view of the pneumatic elements of the automatic dough cutter of FIG. 1.

Included within the dough cutter housing 11, as shown in FIG. 7, are an air compressor 105 that is linked by a line 106 to an air tank 107 that, in turn, connects to solenoid operated valve 109 through hose or line 108. Air under pressure is thereby supplied to operate the pneumatic components of the invention, as will be explained in detail later herein. The compressor 105 and air tank 107 are not shown in detail and, it should be understood, are preferably conventional assemblies that, along with an electrical motor and controls, are contained within the housing 11. For providing operator control, the front panel 15 includes gauges 17, pressure adjustment knobs 18, a ready status light 19, and a systems electrical on/off switch 20. The respective gauges, control knobs, lights and switches are, of course, to monitor and control operation of the dough cutter 10 and the functioning thereof, as will be described in detail later herein with respect to a description of the schematic of FIG. 8.

Figure 2:
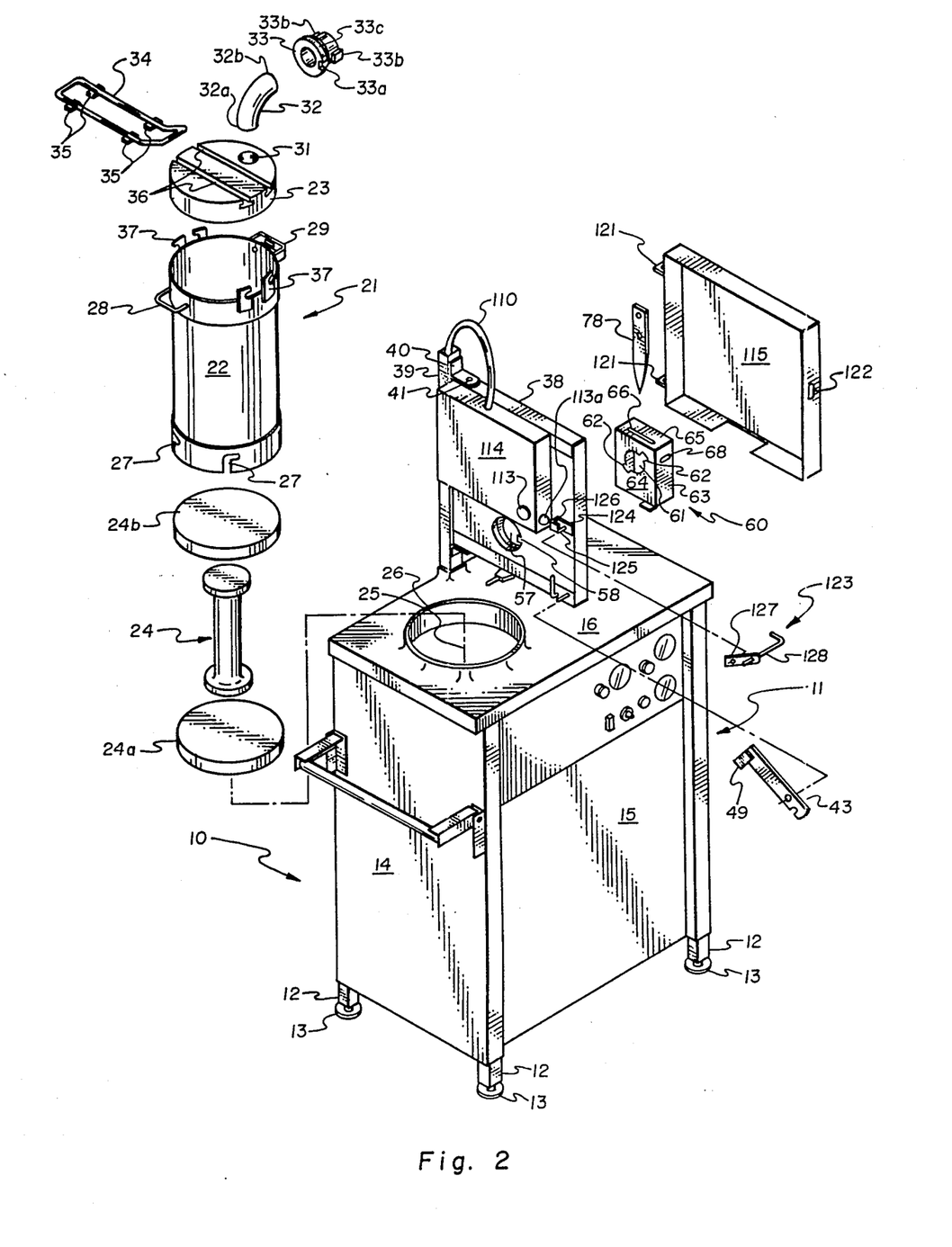
FIG. 2 is an exploded view of the component assemblies of the automatic dough cutter of FIG. 1.

FIG. 2 shows an exploded view of the pneumatically operated component assemblies of the present invention. Not shown are the electric motor driven compressor 106 and air tank 107, it being understood, as set out above, that these are preferably conventional readily available items. FIG. 2 shows, at 21, a dough storage and extruding vessel that consists of a cylindrical housing 22 having an open top end that is closed over a vessel cover 23 and has a dough piston 24b fitted to travel longitudinally therein. Dough piston 24b travel is controlled by a push rod 24 whose ends contact, respectively, the dough piston 24b under face and the top face of a pneumatic piston 24a. The pneumatic piston 24a under face is acted upon by air under pressure entering the cylindrical housing 22, which air under pressure urges that pneumatic piston to travel upwardly within the cylindrical housing 22. The dough piston 24b, in turn, acts against dough within an upper portion of the cylindrical vessel, as will be explained hereinbelow. A stop arrangement is provided with the cylindrical housing 22, not shown, that provides electrical switch control so as to limit vertical travel of the dough piston 24b.

In FIG. 2 the top portion of cylindrical vessel 22 is shown exploded out from an opening 25 in table 16 that includes a ring 26 secured therein that extends upwardly from the flat top 16 surface. Ring 26 serves as a guide for fitting a top or upper portion of the cylindrical vessel into the housing 11, with the cylindrical vessel lower end including dogleg or right angle slots 27 formed at spaced intervals. The right angle slots 27 are to receive and fit over lock pins, not shown, that are secured to the pressure chamber portion of the cylindrical vessel. The cylinder vessel is secured within the housing by fitting that upper portion of the cylindrical vessel lower end through the ring 26, telescoping it into that housing until contact is made with the lock pins, not shown. Thereafter, that upper portion of the cylindrical vessel is turned such that the pins travel within the right angle or dogleg slots until the slot end is reached. This turning is accomplished by an operator gripping a cylindrical vessel top portion handle 28 and lock handle 29 and appropriately turning the vessel. Only when the cylindrical vessel is appropriately locked to a lower or pressure chamber portion of the dough cutter 10, not shown, will an extension nozzle 32 and a latch 42 for maintaining the cover 23 to extrusion panel 38 be properly aligned so as to allow systems functioning, as will be described in detail later herein.

The cylindrical vessel 22 components are thereby secured in the housing 11, and the push rod 24 end is placed on top of the pneumatic piston 24a with the dough piston 24b positioned on top of the other push rod 24 end. The pneumatic piston 24a is thereby arranged to travel, as illustrated in FIG. 7, within the cylinder vessel lower portion that is closed across its lower end or pressure chamber portion, as set out above, and is connected to a source of air under pressure.

The cylindrical vessel 22 upper portion is to receive dough deposited therein through an open top end that can be covered over by vessel cover 23. The dough contained in that vessel is moved with travel of the dough piston 24b, the face engaging that dough to urge it out from an opening 31 formed through that vessel cover 23. Opening 31 receives and maintains an end 32a of an extrusion tube 32 that, as shown, is bent at a right angle with the opposite extrusion tube end 32b for installation in an extrusion nozzle 33. The arrangement of the functioning of the extrusion nozzle 33 will be shown and described in detail later herein.

Shown best in FIGS. 1 and 2, the vessel cover 23 is secured across the open end of the upper portion of the cylindrical vessel 22. To provide for locking of the vessel cover 23 over the vessel open top end, the present invention provides a bar 34 that, as shown, is formed from a section of rod that is joined at the ends and is bent to have opposite parallel sides with parallel ends. One of which bar ends is preferably bent upwardly for insertion into guide slots 36 and gripping by an operator. The bar 34 includes shoes 35 fitted to the undersurface thereof in parallel spaced apart relation that are each shown to consist of a flat plate section that is joined centrally at a right angle to the bar parallel sides undersurface, each shoe to fit and travel within the appropriate parallel keyway or guide slot 36, which guide slots are formed across the top surface of the vessel cover 23. To install the cover over the upper portion of the cylindrical vessel 22 open end, the shoes 35 are slid within and along the keyways 36 to the attitude shown in FIG. 1. Thereby, the bar 34 ends are positioned to be aligned with the opening in right angle tabs 37 that extend outwardly at spaced intervals across from one another from the cyindrical vessel upper portion open end. The bar 34 ends are to travel into openings in each right angle tab 37 when the vessel top is rotated appropriately, thereby locking that vessel top in place. So arranged, as will be discussed in detail later herein, the locking handle 29 of the cyindrical vessel upper portion will be exactly opposite to a locking tab 50 that extends at a right angle centrally from a lower edge of an extrusion panel 38. With the locking tab 50 fitted through locking handle 29 a latch type coupling is provided for securing that extrusion panel to the cylindrical vessel after the vessel cover 23 is properly arranged in covering engagement over the cylindrical vessel 22 open end locking the extrusion tube 32 in place. So arranged, dough pressurized by dough piston 24b will be forced through hole 31 and through tube 32 to be extruded from nozzle 33, as will be described in detail hereinbelow.

In FIGS. 1, 2, 3, and 4 is shown extrusion panel 38 as being a narrow rectangular panel that is hinged along one edge to an upright standard 39. As shown best in FIG. 2, standard is preferably a square tube and is connected on one end to extend at a right or normal angle upwardly from the housing flat top 16, proximate to one edge thereof. Standard 39 is preferably hollow to accommodate a pressure line 110 and electronic control and safety switch wiring fitted therethrough. For mounting the extrusion panel 38 to the standard 39 the standard includes spaced apart right angle brackets 40 that are secured proximate to the standard top end and from the standard junction with the flat top 16. As shown best in FIG. 3, the right angle brackets 40 are secured such that outwardly projecting legs of each face oppositely, each leg holed for accommodating a hinge pin 41 that is turned through the bracket leg and into an appropriate recess formed in an extrusion panel end, proximate to the common edge. The holes in the opposing bracket 40 legs are each preferably threaded as are the pins 41 above a smooth shaft end. Each pin 41 is to be turned through the bracket leg threaded hole, a smooth pin end thereof of lesser diameter than the pin body to travel into the hole formed in the extrusion panel end, which extrusion panel end hole is shouldered to receive the lesser diameter pin end, forming a hinge coupling therewith. Extrusion panel 38 is hinged so as to allow for a telescoping coupling of the extrusion tube end 32b into the extrusion nozzle 33 when the extrusion nozzle is mounted in the extrusion panel 38, as set out in detail hereinbelow. Coupling of the extrusion panel 38 to the cylindrical vessel at the lock handle 29 is provided, as shown best in FIGS. 6A and 6B, by a latch 42, discussed immediately below.

Figure 6A:
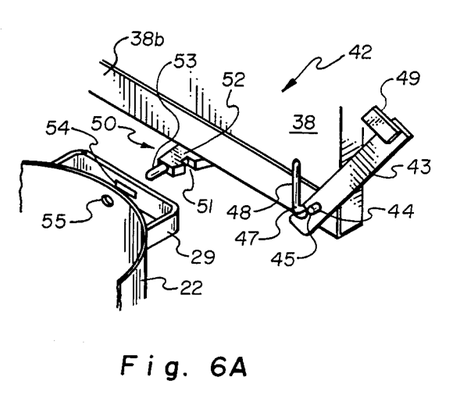
FIG. 6A is a view of a panel latch of FIGS. 1 and 2 that is shown open.
Figure 6B:
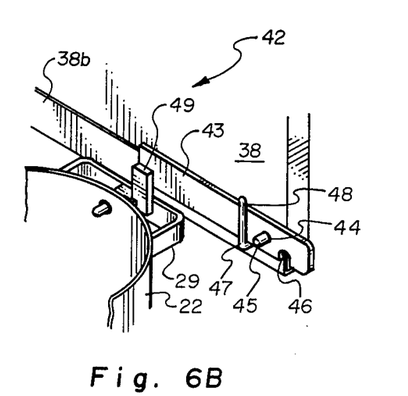
FIG. 6B is a view like that of FIG. 6A, showing the panel latch closed.

Latch 42 is shown best in FIGS. 6A and 6B as consisting of a bar 43 that is holed at 44 proximate to one end thereof to fit over a pin 45. Pin 45 extends at a normal or right angle from the extrusion panel surface adjacent to the lower corner thereof that is opposite to the lower extrusion panel hinge that couples to the standard 39. Shown in FIG. 6B a notch 46 is formed in the one edge of bar 43, between the bar end and the pivot hole 44, which notch 46 is intended to travel into a dogleg guide 47 when the latch bar 43 is pivoted to the attitude shown in FIG. 6A. The dogleg guide 47 includes an upstanding leg 48 that serves to guide and maintain the bar 43 on post 45 when that bar is pivoted to the attitude shown in FIG. 6B. A dog 49 is included on the opposite end of latch bar 43 that extends at a right or normal angle from the lower edge of the latch bar and is preferably rectangular in shape. The dog 49 is intended to fit within a notch 51 that is formed in a locking tab 50, which locking tab extends at a right angle outwardly from the lower edge of the extrusion panel 38.

The locking tab 50, as shown best in FIG. 6A, consists of an inwardly tapering body 52 that is secured along its widest end to the lower edge of the extrusion panel, tapering inwardly therefrom and terminates in a round post end 53. Shown in FIG. 6A, the locking tab 50 is for alignment to fit and travel into a rectangular slot 54 that is formed at a longitudinal midpoint through the web portion of locking handle 29, which locking handle is secured to extend outwardly at a right angle from the end of the upper portion of the cylindrical vessel 22. Shown best in FIG. 6A, a round hole 55 is formed through the sidewall of the upper portion of the cylindrical vessel 22, proximate to the edge thereof. Round hole 55 and locking handle 29 rectangular hole 54 are aligned with to receive, respectively, the round pin end 53 and the body 52 of the locking tab 50 passed therethrough when the extrusion panel 38 is pivoted to the position shown in FIG. 6B. Thereat, as illustrated in FIG. 6B, the latch 42 is lowered around its pivot coupling to pin 45 such that the dog 49 will travel into the locking tab notch 51. So arranged, the locking tab butts against the locking handle 29 inner surface prohibiting withdrawal of the locking tab 50 from its seat in slot 54. The extrusion panel 38 is thereby locked to the locking handle 29. Additionally, in the configuration shown in FIG. 6B, the pin end 53 of the locking tab 50 will have passed the hole 55 in the upper portion of the cylinder vessel 22 and into a hole, not shown, that is formed in the vessel cover 23, further locking the cover in closed configuration over the open end of the cylindrical vessel upper portion.

The extrusion panel 38 is thereby securely latched across the locking handle 29, which latched condition is visually verifiable by an operator checking to see that the dog 49 is securely seated in the notch 51 of the locking tab 50. Additionally, as required, a microswitch or like arrangement, not shown, can be included with latch 42. Such arrangement is shown as one of the safety switches shown in FIG. 8 that will be discussed later herein. Obviously, since latch positioning can be verified visually, micro-switch sensing, or the like can be dispensed within, or another type of latch closure sensing can be employed within the scope of this disclosure.

Figure 3:
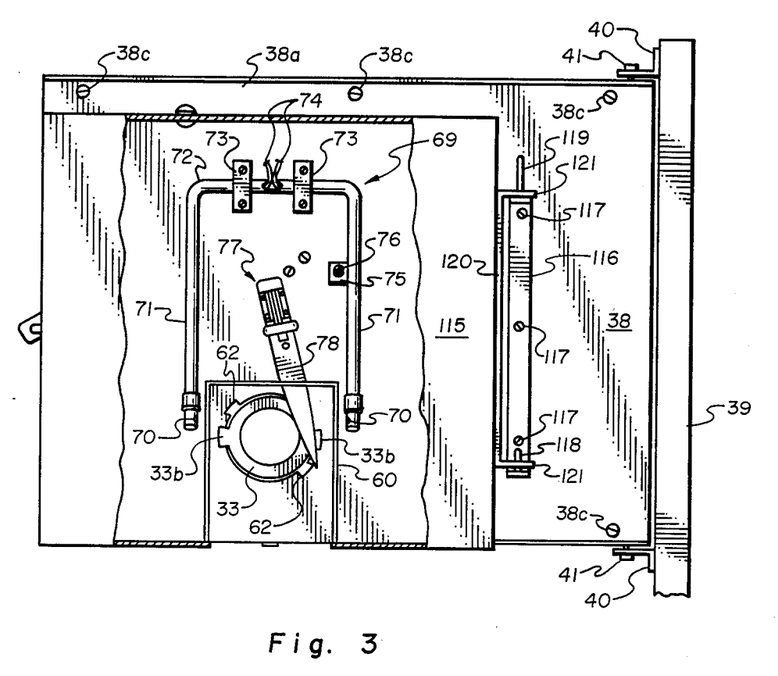
FIG. 3 is an enlarged front elevation view of the extrusion panel of FIG. 1 shown hinged along one edge to an upright standard that extends at a right or normal angle from a housing table, the extrusion panel shown as including a chute that is hinged thereto along one edge and wherefrom a center longitudinal section has been removed exposing a dough nozzle with a knife shown arranged therewith that includes a blade that oscillates back and forth across the nozzle opening.

Shown in FIGS. 1, 2, 3, 6A, and 6B, the extrusion panel 38 is preferably supported between top and bottom right angle members shown, respectively, in FIGS. 6A and 6B as 38a and 38b. Preferably, the extrusion panel 38 is formed from a hard rigid, smooth surface material such as a smooth hard plastic that will lend itself to being effectively cleaned, and the right angle brackets 38a and 38b are preferably faced such that the junction of each of their right angle legs is connected to the junction of extrusion panel end and its face that does not comes in contact with dough, as illustrated in FIG. 3. Thereby, extrusion panel cleaning is simplified and a likelihood that the dough will be caught or trapped thereon as would produce a bacteria contamination is minimized. The respective top and bottom angle members 38a and 38b are for maintaining or mounting the extrusion panel 38 therebetween and are preferably secured to the panel ends with bolts 38c or like couplings. Though, it should be obvious, that other couplings could be so utilized or the members bonded or otherwise secured together within the scope of this disclosure.

The extrusion panel 38, as set out above, is rigidly maintained by the described hinged couplings to the standard 39 and is releasably connected to locking handle 29 so as to firmly seat the end 32b of the extrusion pipe 32 telescoped within the extrusion nozzle 33. When the latch 42 is released the extrusion panel 38 can thereafter be pivoted to the attitude shown in FIG. 6A so as to allow the extrusion pipe end 32b to be unseated from its telescoped coupling to extrusion nozzle 33. Thereafter, the extrusion pipe 32 can be easily pulled out from hole 31 in cover 23, which cover and cylinder vessel upper portion, as set out earlier herein, can themselves be dismounted for cleaning.

Figure 4:
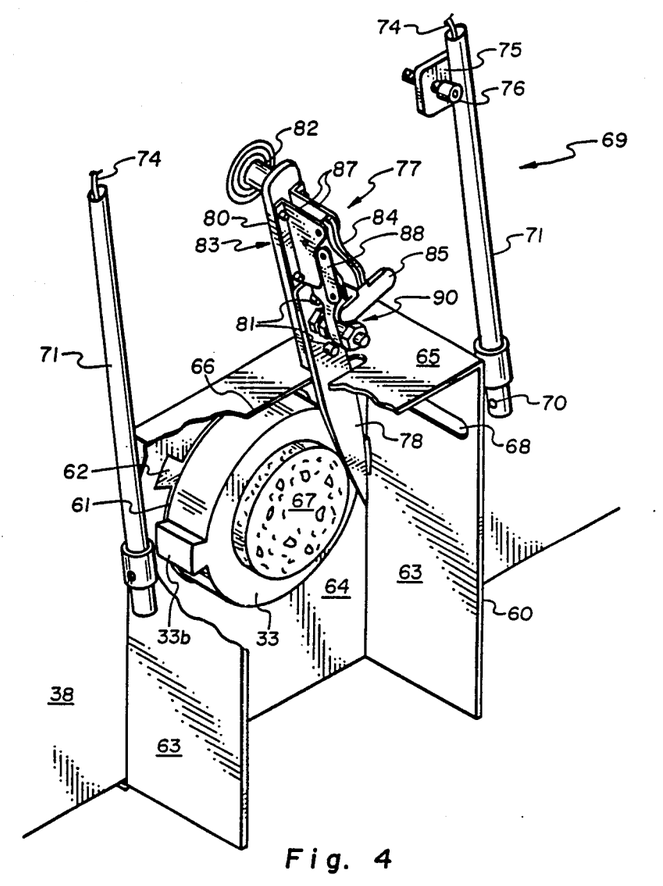
FIG. 4 is an enlarged view of the dough nozzle, optical sensors, oscillating knife blade and chute of FIG. 3, the chute shown partially broken away to expose a column of dough being extruded through the dough nozzle.

Shown in FIG. 2, the extrusion nozzle 33 is formed to have a cylindrical body that tapers inwardly from one face wherein the extrusion pipe is telescoped and includes a lateral locking slot 33a and outwardly extending lugs 33b formed on opposite sides thereof and terminates in the opposite nozzle face that is wiped by blade 78 of oscillating knife 77. To lock the extrusion nozzle 33 in place, as illustrated best in FIG. 2, the nozzle is aligned to be fitted through a round opening 57 that is formed through the extrusion panel 38. The backside of hole 57 is shown to include a node or pier 58 projecting inwardly towards the hole axis, which pier is to fit to slide within the lateral locking slot 33a of that extrusion nozzle 33. Proper extrusion nozzle 33 positioning is thereby obtained when the node or pier 58 is aligned with and slid along the extrusion nozzle locking slot 33a. With the extrusion nozzle properly positioned in the extrusion panel 38, a chute 60 is then fitted thereover. Chute 60, as illustrated in FIGS. 2 and 4, is open across a front face and bottom end and includes an opening 61 formed in face 64 that has the same shape with a slightly larger diameter than the extrusion nozzle end. Opening 61 is shown to include keyway openings 62 notched at intervals in the circumference, which keyway openings 62 are each arranged to pass a lug 33b of the extrusion nozzle therethrough. A circumferential extrusion nozzle groove 33c is preferably formed around the nozzle, proximate to the lateral center thereof and back from the lugs 33b to accommodate the chute 60 turning thereon. So arranged, to install the chute 60 in locking engagement over the extrusion nozzle 33, it is fitted over the extrusion nozzle 33, the lugs 33b passing through the keyway openings 62, that travel beyond the chute surface. Sections of the chute face 64 are then positioned behind the nozzle lugs 33b by turning the chute 60, as shown best in FIG. 4, thereby locking it to the extrusion nozzle. Further, as the diameter of the largest face of the extrusion nozzle 33 is greater than is the diameter of the opening 61, locking of the one extrusion nozzle face, as set out above, also provides for securing it in the extrusion panel 38.

The extrusion nozzle 33 is preferably formed from a hard material that can be conveniently shaped such as a hard plastic that is suitable to being washed in a conventional dishwashing machine, or the like, for cleaning and sterilizing that nozzle between uses. So arranged, the extrusion nozzle 33 and the chute 60 are easily removable along with the extrusion tube 32, cylindrical vessel 22 upper portion, vessel cover 23 and dough piston 24b, for ease of cleaning in a conventional dishwasher or the like, to sterilize those components and prohibit bacteria growth.

Shown best in FIG. 4, the chute 60 with face 64 includes parallel sidewalls 63 that project outwardly at right angles from parallel edges of face 64 wherein the described hole 61 and keyway openings 62 are cut. A chute top 65 is secured across the upper ends of the chute sides and to the top face edge. The chute front, as set out above, is left open to be closed over by a cover 115, as will be described in detail later herein. Chute 60, as shown in FIG. 4, additionally includes a longitudinal slot 66 formed in the top 65, at approximately its lateral mid-point. Slot 65 is for receiving a blade 78 fitted therethrough. The blade 78 is part of an oscillating knife 77 that, as illustrated in FIG. 4, is operated to sever or cut an end section from a dough extension 67 that is passed out from the opening in extrusion nozzle 33. In operation, the edge of blade 78 will pass through the extruding dough 67, cutting a segment off from the extrusion end, which cut section will then fall through an open bottom end of the chute 60 and into a catchment vessel, not shown. Obviously, the longitudinal slot 66 must be of sufficient length to accommodate the back and forth travel of blade 78.

Additionally, in the preferred embodiment, the side panel 63 of chute 60 each include curved lateral slots 68 formed therethrough, which slots are aligned with optical sensor ends 70 of an optical sensor 69. The preferred optical sensor 69, as shown in FIG. 3, consists of a U-shaped housing having essentially parallel legs 71 with a web 72 therebetween. The web 72 is pivotally mounted by brackets 73 to the extrusion panel 38 face. Shown best in FIG. 4, the sensor ends 70 are each electrically connected through wires 74 to a control board 135, shown as a block in the schematic of FIG. 8, which control board directs operation of the oscillating knife 77. In practice, the optical sensor ends 70 consist, respectively, of a a light source that projects a beam of light that is not the visible spectrum and a receiver, the light source to pass light from the one sensor end 70 to the other, across the path of the end of dough extrusion 67. So long as the light is sensed, the oscillating knife 77 is not operated. Where that dough extrusion blocks that light path, the control board 135 commands through a solenoid 103, shown in FIG. 8, the operation of the oscillating knife 77. The oscillating knife blade 78 then swings through the dough end, cutting a section therefrom. Blade 78 is operated to cleanly cut through the dough end, that severed dough end then falling through and from chute 60. A capability for adjusting the width of the cut dough segment is provided by the inclusion of a tab 75 with the optical sensor web 72 that, as shown in FIGS. 3 and 4, has a threaded center opening wherein is to be turned a screw 78. A screw 76 threaded end, when turned into the tab center opening passes therethrough to engage the face of the extrusion panel 38. Thereby, with the optical sensor web 72 pivoting at brackets 73 a desired distance between the panel face and the light sensor legs 71 can be set. In adjusting the optical sensor 69 positioning, the optical sensor ends 70 will move along lateral opening 68 that are formed in the chute side 60. So arranged, the light sensor ends will always be visible to one another. Optionally, within the scope of this disclosure, another photoelectric control identified as a proximity sensor can be employed for detecting the dough extrusion end at a set distance for extrusion nozzle 33 to command the operation of oscillating knife 77 or a mechanical cantilever sensor can be employed within the scope of this disclosure. In practice, a proximity sensor manufactured by True Beam Electronics, identified as #1355A-6517 has been so employed, the transmitting and receiving ends of that sensor positioned to "lock" through an opening in the chute top 65.

As set out above, the oscillating knife 77 is operated on command from the optical sensor 69. To provide, as shown best in FIGS. 4 and 5, for mounting blade 78 thereto, the blade includes a pair of longitudinally spaced apart holes 79 that are formed through a shank end thereof that are for fitting over spaced apart posts 81 that extend from a forward face of a bar knife blade mount 80, hereinafter referred to as mount 80. Mount 80 is essentially a bar that has an upper or top end 80a that is secured to a pivot shaft 82 that, in turn, extends at a right or normal angle from a rear face of that mount. Pivot shaft 82, as will be described in detail relative to FIG. 7, is pneumatically operated to oscillate or turn back and forth responsive to a pneumatic flow into a cylinder 100.

Figure 5:
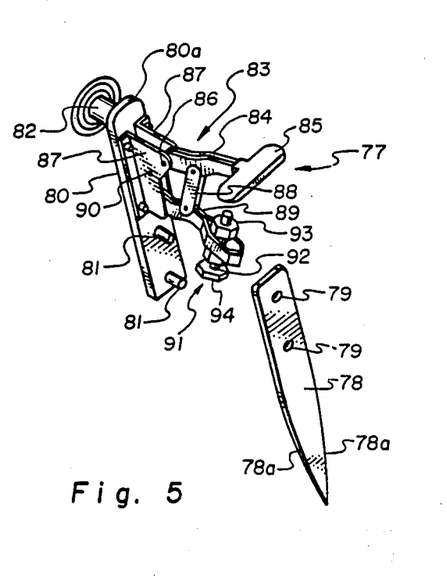
FIG. 5 is a view of the oscillating knife blade of FIG. 4, shown exploded from a bar mount thereof.

Blade 78, as shown best in FIG. 5, is readily detachable for ease of cleaning and sharpening of the opposing edges 78a thereof. To provide for maintaining the blade mounted at holes 79 to posts 81. The oscillating knife 77 preferably incorporates a toggle clamp 83 that includes an arm 84 that has a handle 85 fixed across a top end thereof, its opposite end pivotally coupled at 86 across a slot opening between right angle supports 87. The supports 87 each consist, respectively, of a short leg or side that has holes formed at intervals therealong for receiving fasteners fitted therethrough for securing it to mount 80, and a long leg or side that extends at a right angle therefrom. The respective right angle supports, as shown, are parallel, faced oppositely and are spaced apart to pass the arm 84 therebetween, the end of which arm is pivotally coupled therebetween at 86. A bar 88 is provided with clamp 83 that is pivotally coupled on its one end to a mid-pont of arm 84 and has its opposite end pivotally coupled to a mid-point of a clamp brace 89. Clamp brace 89 is, in turn, pivotally coupled at 90 between the parallel sides of upstanding legs or sides of right angle supports 87 and has its opposite end formed into a foot 91. Foot 91 is open centrally to receive bolt 92 fitted therethrough and turned through locking nuts 93 for adjusting the height of a head end 94 thereof. The height of the head end 94 above the end of the clamp brace 89 is thereby adjustable by turning the bolt 92 through nuts 93 to provide for tightly butting that head end 94 against the shank end of blade 78, as illustrated in FIG. 4. So arranged, that foot head end 94 is moved into close fitting engagement against the surface of the shank of blade 78, binding it to mount 80.

With the blade 78 secured to the face of mount 80, the mount and blade will thereafter move together as the pivot shaft 82 is turned. Shown best in FIGS. 5 and 7, the pivot shaft 82 is journaled through the extrusion panel 38 and connects on its end opposite to mount 80 to an arm 96. Turning of arm 96 will thereby oscillate the blade 78 back and forth across extension nozzle 33 face cutting across the path of the extruding dough 67. The blade 78 is set to just wipe across that extrusion nozzle surface. Accordingly, the opposite blade edges 78a should be sharp to facilitate the blade cleanly cutting through that dough. The blade 78 is intended to be moved with sufficient force and speed to facilitate a blade edges 78a passing cleanly through the dough column that may include hard items such as chunks of chocolate, nuts, or the like. The present invention employs the pneumatic arrangement set out below to provide this required rapid blade sweep, and utilizes sharp edges 78a for blade 78 to facilitate making such clean cut.

Figure 8:
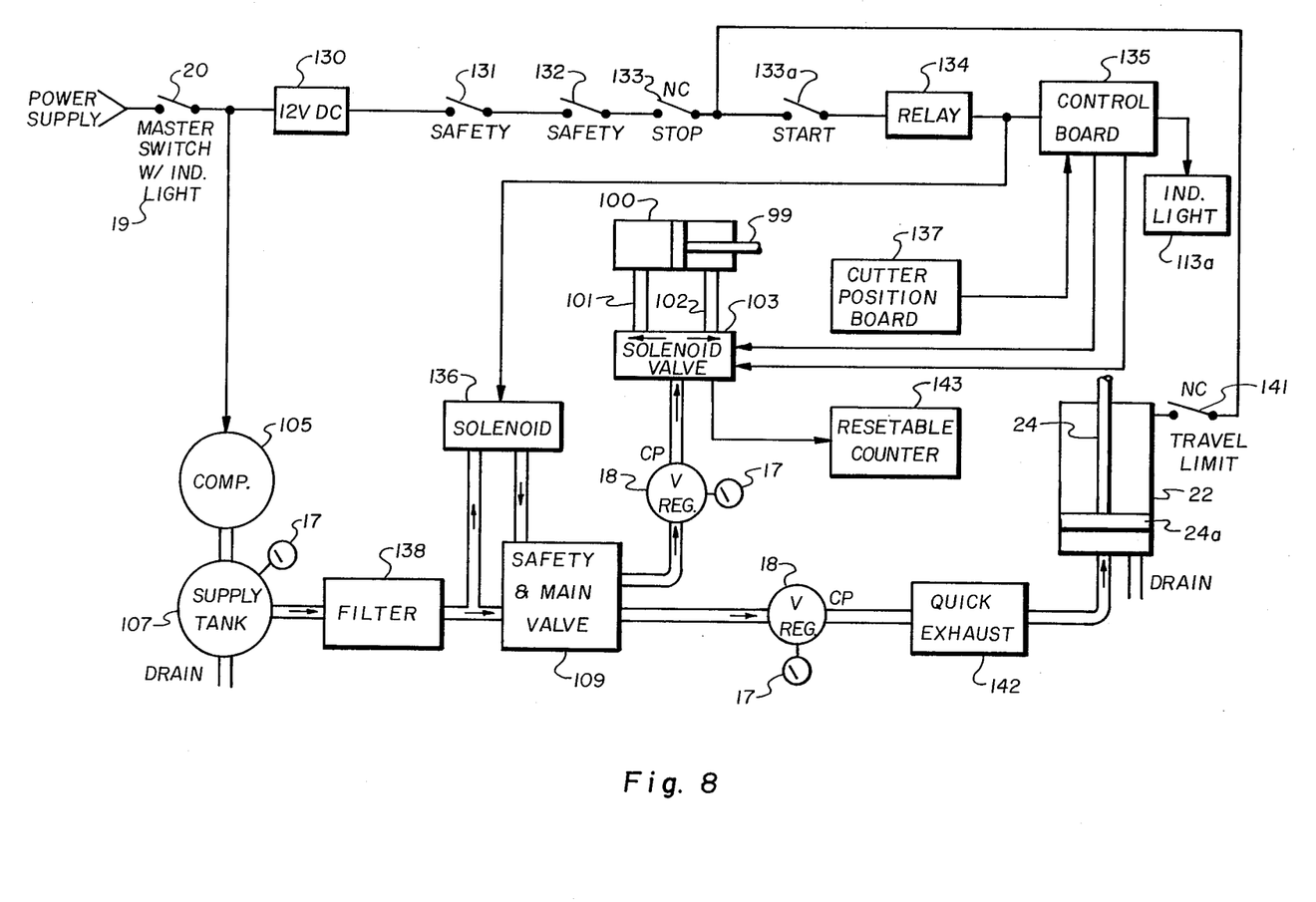
FIG. 8 is a block flow schematic of the automatic dough cutter of FIG. 1.

As set out above, the knife 77 is preferably pneumatically operated to oscillate back and forth across the face of extrusion nozzle 33. This wiper action of knife blade 78 is provided, as shown best in FIG. 7, by a travel of piston 99 within a cylinder 100. The piston 99 includes a clevis 97 on one end that is pivotally coupled at 98 to pivot arm 96. The opposite end of pivot arm 96 is secured to turn the pivot shaft 82. The pivot shaft 82 is secured to extend at a normal angle from the knife base 80 and is journaled through a mount 95 that is shown to have holes formed therein for securing it to the extrusion panel 38. The pivot shaft 82 is thereby coupled to rotate or turn with pivot arm 96 that is, in turn, pivoted by back and forth travel of piston 99 in cylinder 100. The pivot arm 96 end opposite to piston 99 is fitted to travel longitudinally within cylinder 100 and is preferably double-acting. Thereby, when air is introduced into cylinder 100 above a head end thereof through line 101, that air will move the piston opposite to the pneumatic pressure. When air under pressure is introduced below the head end, through line 102 the piston 99 will move in the opposite direction. Lines 101 and 102 extend, respectively, from a block that should be understood is a bi-directional valve 103. The bi-directional valve 103, as will be described later herein with respect to a description of the schematic of FIG. 8, is preferably solenoid operated to route air under pressure on command from the optical sensor, that flow passed either through line 101 or 102, appropriately pivoting the knife blade 78.

Additional to the pneumatic assembly for operating knife 77, FIG. 7 also shows, as a pneumatic source, a compressor 105 that is linked by an air line 106 to a reservoir 107. The reservoir feeds air under pressure therefrom through a line 108 into a routing solenoid operated valve 109 that provides for routing air therethrough to the pneumatic assemblies of the invention. From valve 109 the air flow is transferred through a line 110 to the bi-directional valve 103 for operating the knife 77 and into the pressure chamber portion of the cylindrical vessel 22 for moving the pneumatic piston 24a that ultimately moves the dough piston 24b through push rod 24.

Shown in FIG. 1, knife 77 is indicated to be in a ready state when an indicator light 113a on an edge of cover 114 is illuminated. Thereafter, by depressing button 113 that is also located on cover 114 air under pressure is routed to cylinder 100, as shown in FIG. 7, to operate knife 77. While not shown, it should be understood the cylindrical vessel 22 has a bottom plate that is plumbered to pass air under pressure into that lower cylinder portion that acts on the under surface of the pneumatic piston 24a, causing that piston to travel to urge the push rod 24 upwardly against dough piston 24b. Such pneumatic piston travel 24a is limited by exhaust ports formed within the cylindrical vessel at a certain height of piston travel. Should the pneumatic piston pass these ports the air under pressure will be automatically vented and a travel limit switch activated, the system thereby shut off at a safety and main valve 109, as shown in FIGS. 7 and 8.

The cover 114 hereinabove discussed in relation to button 113 and indicator light 113a is preferably secured to extrusion panel 38 with coupling devices such as screws or like fasteners, and may, in association therewith, include a limit switch such as a conventional micro-switch sensor that is arranged to close when that cover 114 is in place on the extrusion panel face, covering the valve 103, cylinder 100, connecting lines 101 and 102 and mount 95.

Shown also in FIGS. 1 and 2, an extrusion cover 115 is provided for the extrusion panel face to cover the oscillating knife 77 including the blade 78 and mount 80, and provides, when closed, a front face to chute 60, as illustrated in FIGS. 2 and 3. Extrusion cover 115 is preferably hinge connected to extrusion panel 38. A preferred hinge coupling arrangement is shown in FIG. 3 as including a bracket 116 that is mounted to the extrusion panel 38 by screws 117, or like fasteners. Bracket 116 is shown to include ends that are bent at right angles to a web that have, respectively, a lower pin 118 and an upper pin 119 extending therefrom. The extrusion cover 115 includes a cover bracket 120 that is mounted centrally along one edge thereof, as illustrated best in FIG. 3. Cover bracket 120 has end tabs 121 formed thereto that are each bent a right or normal angles, each having a hole formed therethrough for receiving, respectively, the lower and upper pins 118 and 119, providing the hinge coupling.

To provide locking of the extrusion cover 115 to the extrusion panel 38, a slot 122, tha is shown best in FIGS. 1 and 2, is formed centrally in the extrusion cover 115 edge opposite to the hinge arrangement to receive a right angle bent end of a pin 128 of a lock 123. Lock 123, as shown best in FIGS. 1 and 2, involves a U-shaped bracket 124 that is secured at its longest leg to the extrusion panel 38, a web 126 thereof extending parallel to the panel ends, with a pin 125 shown extending outwardly from that bracket longest leg. The U-shaped bracket 124, from the web 126, is bent back upon itself into a short leg that is parallel to its long leg. The end of the short leg is just back from and at a right angle to the pin 125. The pin 125, shown in FIGS. 1 and 2, is to fit in a hole formed through one end of a bar 127 that mounts on its other end the end of pin 128. The pin 128 end is formed into a hook that, as illustrated in FIG. 1, is to fit into the hole 122 that is formed in the side of extrusion panel 115, for locking that panel in place. When not in use, the bar 127 and pin 128 can be pivoted on pin 125 to a position that is essentially aligned with the edge of the extrusion panel 138. Additionally, as will be set out with respect to an explanation of the schematic of FIG. 8, it should be understood that a microswitch is preferably included with the extrusion panel 38 arranged to sense closure of the extension cover 115 thereto. The preferred sensor such as a micro-switch will sense a closed attitude when the extrusion cover 115 is properly in place on the extrusion panel 38 and will thereat electrically enable functioning of the pneumatically operated components of the dough cutter 10. Such a micro-switch is shown as a safety 131 or 132 in FIG. 8 and its functioning is described hereinbelow with respect to a description of the dough cutter functioning.

Shown in the block flow schematic of FIG. 8 and in FIG. 1, an indication that the pneumatic system is ready to operate is provided by an indicator light 19. With light 19 illuminated, the system can be operated by pressing button 20. Depressing button 20 makes power available to operate compressor 105 and to a transformer identified at 130 as 12 VDC.

From the power supply, after a master switch, the power splits, the one leg providing a voltage at the compressor 105 to compress air that is stored in a supply tank 107. A reading in psi of the air available is shown on gauge 17 that is located on the housing front panel 15, shown in FIGS. 1 and 2. The other power leg provides a voltage to control circuitry, first through a transformer 132 that converts the input AC to twelve (12) volts DC for operating relays and solenoids as described below. From the DC transformer 132, the power is shown to pass through two safety switches identified, respectively, as 131 and 132. These safety switches, it should be understood, are the micro-switches described earlier herein with reference to lock out circuitry associated with sensing the travel limit of pneumatic piston 24a and, of course, additional safety switches can be employed such as one for sensing extrusion panel 38 locking to the locking handle 29, and the like within the scope of this disclosure and extrusion panel cover 115 closure over the extrusion panel 38. With the safety switches 131 and 132 in the closed position, voltage is allowed to pass therethrough to a stop switch 133 and a start switch 133a. The stop switch 133 is connected to be closed to pass a voltage therethrough upon depression of the button to open the circuit. Stop switch 133 thereby functions as a safety stop switch depressable by an operator, which switch, when operated brakes the circuit thereby shutting off the pneumatic components. With the safety switches 131 and 132 closed, an operator, by depressing start switch 133a can pass a voltage to a relay 134 that connects to pass voltage to both a control board 135 and a solenoid 136. The control board 135 directs pneumatic element functioning and includes therewith an indicator light 113a. Indicator light, as set out above, is located on the edge of cover 114 that also includes button 113 on its face, button 113 for commanding operation of the oscillating knife 77. Also linked electrically to the control board 135 is shown a cutter position board 137 that is connected to the optical sensor 69. The cutter position board senses the blade 78 positioning and relays that information to the control board that appropriately commands, upon depression of button 113, solenoid 102 directs air under pressure through either line 101 or 102, as shown also in FIG. 7. So arranged, as described earlier with respect to the description of the operation of oscillating knife 77, piston 99 is moved either from or into cylinder 100 to pivot the blade 78 back and forth across the face of extrusion nozzle 33. Shown in FIG. 8, the number of swings blade 78 is counted on a reset counter identified as 143 that is preferably located in a panel or housing surface to be visible to the operator.

For providing air under pressure to operate the solenoid valve 103, the schematic of FIG. 8 shows an air flow as routed through a solenoid 136 that is supplied a control voltage after relay 134. Relay 134 provides for passing air under pressure to a safety and main valve 109. The safety and main valve 109 is shown also as a block in FIG. 7 and is to provide air under pressure to operate the solenoid valve 103 of the oscillating knife 77 and to provide air under pressure to an inlet located in a bottom plate of cylindrical housing 22 below the pneumatic piston 24a, as described earlier herein with respect to a discussion of FIGS. 2 and 7. Pneumatic piston 24a travel is thereby provided by passing a flow of air under pressure into the cylindrical vessel, the pneumatic piston 24a thereby traveling opposite to that flow; urging the push rod 24 therewith that is also in contact with the undersurface of dough piston 24b, as shown in FIGS. 2 and 7. The dough piston, of course, acts against a dough contained within the cylindrical vessel 22 upper portion. That dough, as earlier described, is thereby forced through extrusion tube 32 and out from the extrusion nozzle 33.

Shown in FIG. 8, is a block identified as a quick exhaust 142 that, as set out above, is part of the cylindrical vessel. Such quick exhaust may consist of holes formed through that vessel above a limit of pneumatic piston 24a travel. This quick exhaust is in addition to a limit sensor shown as a safety switch 131 or 132, and is to exhaust the air under pressure when that pneumatic piston travel exceeds a certain height limit. Also shown in FIG. 8, the air under pressure that passes through the safety and main valve 109 travels through pressure regulator 18 that includes a pressure gauge 17, these components are shown in FIGS. 1 and 2 as part of a control panel 15 of the dough cutter 10 of the present invention.

Hereinabove has been set out a preferred structure and flow sequence wherein the components of the dough cutter 10 of the present invention have been described. With the above structural and functional description a preferred configuration of the dough cutter of the present invention has been shown. It should, however, be understood that the present invention may be embodied in other specific forms and arrangements without departing from the spirit or essential characteristics set out herein. The present disclosure is therefore to be considered in all respects as illustrative only and is made by way of example and that variations that are within the scope of the disclosure are possible without departing from the subject matter coming within the scope of the following claims, which claims I regard as my invention.

Further, it should be understood any changes as would come within the meaning and range of equivalency of the following claims are to be understood to be embraced herein.

I claim:

1. An automatic dough cutter comprising, a housing for containing and mounting the dough cutter components; means for providing air under pressure on demand to the moving components of the dough cutter; vessel means for containing dough and including piston means for travel therein against contained dough; cover means for releasable connection by lock means over a vessel means, open end wherein below said dough is contained, said cover means including a port to pass dough under pressure therethrough into an end of an extrusion pipe that is fitted therein, which extrusion pipe opposite end is for telescoping into an extrusion nozzle means that is releasably mounted in an extrusion panel, which extrusion panel is arranged to be movable with respect to said vessel means; means for releasably locking said extrusion panel to said vessel means maintaining said extrusion tube in telescoped connection between said vessel cover means open port and said extrusion nozzle means; oscillating knife means secured to said extrusion panel including a blade arranged to swing back across an opening through said extrusion nozzle wherethrough dough is extruded; sensor means arranged to sense an end of a column of dough extruded through said extrusion nozzle means opening and to command operation of said oscillating knife means; chute means for arrangement with said extrusion nozzle means, securing said extrusion nozzle means in said extrusion panel, segments of dough cut from the extruding dough to fall therethrough; means for locking said chute means to said extrusion nozzle means; and means for controlling functioning of said dough cutter that includes directing air under pressure to move said piston means in said vessel means and said oscillating knife means.

2. An automatic dough cutter as recited in claim 1, wherein the means for providing air under pressure is an air compressor linked to pass air into a storage vessel that is in turn linked to pass or command air under pressure to move the dough piston within the vessel means and to the oscillating knife means to swing the blade thereof wiping across the extrusion nozzle face.

3. An automatic dough cutter as recited in claim 1, wherein the vessel means is a cylinder that can be separated into upper and lower portions, the upper portion for containing dough whereagainst the piston means acts, which cylindrical vessel upper portion is removable for cleaning; and said piston means includes a dough piston for travel in said cylindrical vessel upper portion under the urgings of an end of a push rod that has its opposite end resting on a face of a pneumatic piston that is arranged to travel within the lower portion of said cylindrical vessel under the urgings of air under pressure.

4. An automatic dough cutter as recited in claim 3, further including pressure relief means associated with said cylindrical vessel lower portion to function at a limit of travel of the pneumatic piston to release and vent to atmosphere air acting said pneumatic piston.

5. An automatic dough cutter as recited in claim 1, wherein the vessel cover means is for closing the vessel open top end and includes bar means for interaction with lock tabs that extend vertically at intervals from points around the edge of the vessel open top, said vessel cover including track means formed thereacross wherein said bar means is positioned, the ends of said bar means for fitting into groove means formed across said vessel top, said bar means for turning into horizontal openings in said tab openings locking said vessel cover thereto.

6. An automatic dough cutter as recited in claim 5, wherein the bar means is a continuous rod that is bent to have parallel sides and parallel ends and includes co-planar flat rectangular metal sections that are secured at spaced intervals to the parallel sides as feet that slide into the groove means that are parallel grooves formed across the vessel cover.

7. An automatic dough cutter as recited in claim 1, wherein the extrusion nozzle means is flat and cylindrical in shape and tapers from a greater diameter face to a lesser diameter face, which lesser diameter face is to fit into an opening formed through the extrusion panel, which opening is of lesser diameter than is the extrusion nozzle means greater diameter face, which extrusion nozzle means lesser diameter face includes a pair of co-planar spaced apart lugs that extend outwardly therefrom; and the means for releasably mounting said extrusion nozzle means in said extrusion panel opening is the chute means that is open across one face and its end, the other chute means face having an opening formed therethrough that duplicates the shape of but is slightly larger than the lesser diameter face of the extrusion nozzle means, the chute means to fit over the extrusion nozzle means lesser diameter face for turning thereon so as to bring portions of the chute face behind the extrusion nozzle means lugs.

8. An automatic dough cutter as recited in claim 7, wherein the extrusion nozzle means includes means for aligning it for positioning it in the extrusion panel; and the extrusion nozzle means is formed from a hard plastic material.

9. An automatic dough cutter as recited in claim 7, further including a longitudinal slot formed in the chute means top for accommodating the travel of the oscillating knife blade; and slot means formed in the chute means wherethrough light is passed or reflected to sense the end of dough extruded from the extension nozzle means.

10. An automatic dough cutter as recited in claim 1, wherein the extrusion panel is hinge connected to an upright standard that extends from the housing top, and the means for releasably maintaining said extrusion panel to the vessel means consists of a locking handle that is one of a pair of handles that extend outwardly from opposite sides of the vessel means, the locking handle including a slot formed therein across its web portion; tab means secured to extend at a right angle outwardly from said extrusion panel to align with and pass into said locking handle slot, which tab means includes a notch formed in one edge, which tab means is arranged to pass through said locking handle slot; and latch means consisting of a bar that is pivotally secured on one end to said extrusion panel face wherefrom said tab means projects, and the opposite bar end includes a dog formed thereto that will pass into said tab means notch when said bar is appropriately pivoted.

11. An automatic dough cutter as recited in claim 10, wherein the vessel means further includes a hole formed therethrough that is opposite to the locking handle slot and is to receive a pin formed as the tab means end, said pin to pass through the vessel means hole and into a hole formed in the vessel cover when it is in covering engagement over vessel means top.

12. An automatic dough cutter as recited in claim 1, wherein the oscillating knife means consists of a blade that is sharpened along both edges and includes a shank end that is arranged for releasable attachment to a block means, which block means is pivotally coupled to oscillate the blade sharpened edges back and forth across the extrusion nozzle means face; pneumatically operated means for moving said block means so as to oscillate said connected blade.

13. An automatic dough cutter as recited in claim 12, wherein the blade shank includes a pair of spaced apart longitudinally centered holes formed therethrough that are to pass posts therethrough that extend outwardly, at right angles, from the block means; and pivoting foot means that are arranged to be movable into releasable locking contact against said blade shank end that is fitted onto said bar means.

14. An automatic dough cutter as recited in claim 1, wherein the optical sensor means is U-shaped with aligned ends that include a light source in one end and a light sensor or receiver in the other with pivot means for maintaining the optical sensor web extrusion panel; and means for adjusting the spacing of the aligned light source and sensor ends from the extrusion nozzle means face.

15. An automatic dough cutter as recited in claim 1, further including an extrusion cover that is hinge connected to the extrusion panel so as to swing across the chute means, covering an open face thereof; and means for releasably locking said extrusion cover to said extrusion panel in covering engagement over said chute means.

16. An automatic dough cutter as recited in claim 15, further including means for sensing when the extrusion cover is locked to the extrusion panel.

17. An automatic dough cutter as recited in claim 1, further including sensing means for sensing when said extrusion panel is locked to said vessel means.

18. An automatic dough cutter as recited in claim 17, wherein the sensing means is a micro-swtch that is pressure activated to close a circuit.

19. An automatic dough cutter as recited in claim 17, wherein the means for controlling dough cutter functioning includes a master switch means tht is energized to make electrical power available to the compressor and to operate the other dough cutter electrical components.

20. An automatic dough cutter as recited in claim 1, further including the component elements and surfaces of the dough cutter that reasonably come into contact with dough processed therethrough are arranged to be easily removable for cleaning or are smooth crack free surfaces for cleansing by wiping.

21. An automatic dough cutter that includes a housing containing a vessel and source of air under pressure for operating the moving components of the dough cutter to include operating a piston means within the vessel for urging dough from said vessel through an extrusion nozzle, including an oscillating knife arranged to pass a blade across the nozzle face on sensing a set thickness of dough extruded from that nozzle, the housing further containing command and control components for providing an operator with systems control comprising, arranging the dough contacting components and surfaces to be removable for ease of cleaning including a vessel upper section, dough piston for travel in said vessel, vessel cover, extrusion tube, extrusion nozzle and blade for an oscillating knife with a chute means for coupling to said extrusion nozzle and an extrusion cover for arrangement to an extrusion panel over an open face of said chute.

22. An automatic dough cutter as recited in claim 21, further including, as the extrusion panel, a section of hard smooth material mounted between its parallel top and bottom end by frame members such that the extrusion panel face that is in the plane of the extrusion nozzle opening wherethrough dough is extruded is essentially crack or crevice free.

23. An automatic dough cutter as recited in claim 22, wherein the extrusion panel is holed to receive and pass a small diameter face of the extrusion nozzle that is tapered from greater diameter to lesser diameter faces, that smaller diameter extrusion nozzle face to extend beyond said extrusion panel crack or crevice free surface; and said extrusion nozzle includes a pair of co-planar spaced apart outwardly extending lugs for fitting through an opening formed through a face of the chute means, which opening duplicates the shape of and is slightly larger in diameter than the surface of the extrusion nozzle small diameter face, the chute means after fitting over the extrusion nozzle arranged for turning to bring portions of the chute means face behind the extrusion nozzle lugs, thereby locking said chute means and extrusion nozzle together in said extrusion panel.

24. An automatic dough cutter as recited in claim 21, wherein the dough piston is moved within the vessel upper section by a push rod, a lower end of which rests on a pneumatic piston with the dough piston position on the push rod other end.

25. An automatic dough cutter as recited in claim 21, wherein the extrusion panel is arranged to be locked to the vessel upper section maintaining the extrusion tube telescoped into a hole in the vessel cover and in the extrusion nozzle which extrusion nozzle is maintained in said extrusion panel by the chute means turned thereover.

26. An automatic dough cutter as recited in claim 21, wherein the blade of the oscillating knife includes a pair of spaced apart holes formed through the blade shank; mount means pivotally coupled to the extrusion panel that includes post for fitting through said blade shank holes; toggle clamp means for maintaining said blade shank against said mount; and means for oscillating said mount to swing said blade back and forth across a face of the extrusion nozzle.

* * * * *